(No Model.)
E. A. SAUNDERS.
RUBBER BOOT.
No. 450,698. Patented Apr. 21, 1891.
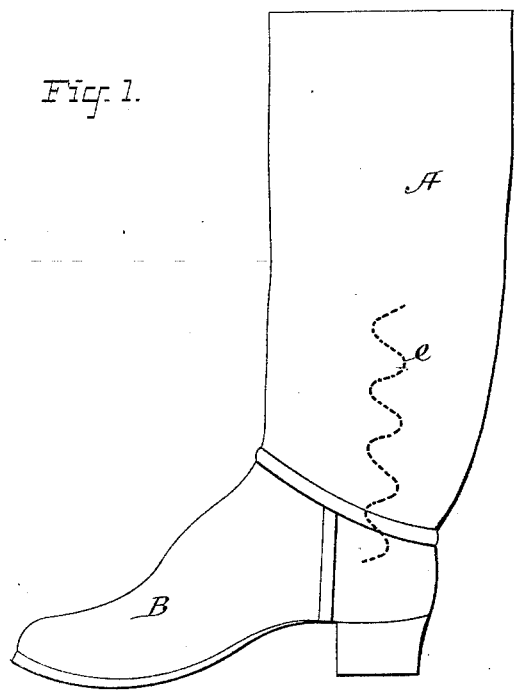
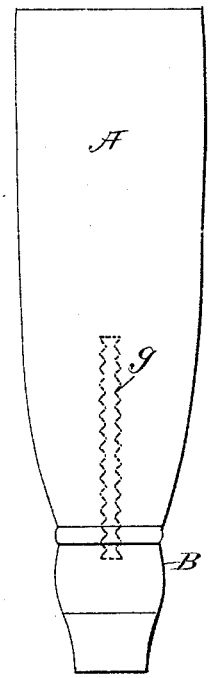
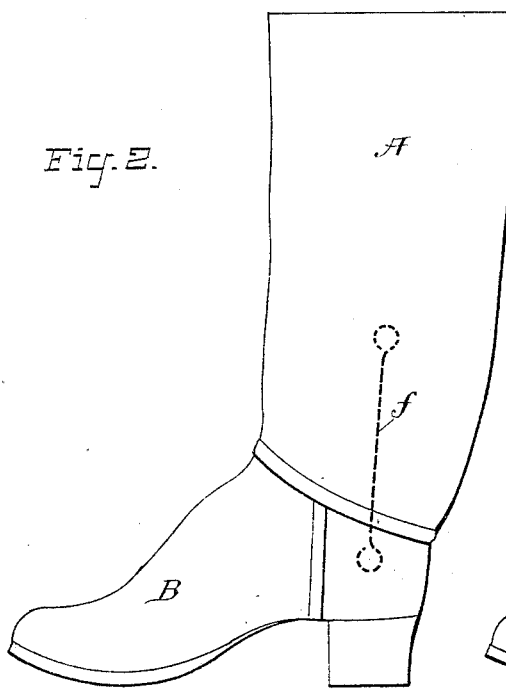
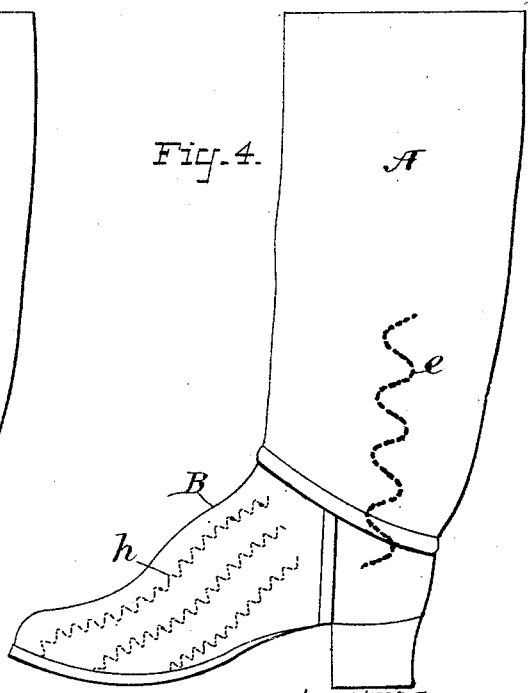
ATTEST:
J. Mundy
F. M. Brown.
INVENTOR:
Emmett A. Saunders
By J. N. McIntire
Attorney

UNITED STATES PATENT OFFICE.

EMMETT A. SAUNDERS, OF NAUGATUCK, CONNECTICUT.

RUBBER BOOT.

SPECIFICATION forming part of Letters Patent No. 450,698, dated April 21, 1891.

Application filed July 23, 1890. Renewed March 13, 1891. Serial No. 384,877. (No model.)

*To all whom it may concern:*

Be it known that I, EMMETT A. SAUNDERS, of Naugatuck, in the county of New Haven and State of Connecticut, have invented a certain new and useful Improvement in the Manufacture of Rubber Foot-Wear; and I do hereby declare that the following is a full, clear, and exact description thereof, reference being had to the accompanying drawings, which make part of this specification.

In the manufacture of rubber or cloth and rubber and other analogous foot-wear previous to my invention it has been customary to render certain portions of the upper of the boot or shoe (as the case might be) sufficiently stiff and strong by thickening up the stock at such localities, or else by supplementing the stock at such points with separate pieces of rubber or of cloth and rubber so patterned or shaped and so applied as to effect the desired end.

I propose to provide for use an article of rubber foot-wear in which those portions which have to be made stiffer and stronger than others are rendered so by the incorporation during the process of manufacture of the boot or shoe of metallic strengthening or re-enforcing devices immovably combined with the rubber or layers of cloth and rubber of which the article is made.

My invention may therefore be said to have for its object the production of a rubber or cloth and rubber boot or shoe in which the parts, usually rendered sufficiently inflexible to be self-supporting when not in use and sufficiently stiff to avoid that angular bending when in use that soon results in a cracking of the vulcanized-rubber material, are afforded the necessary degrees of combined stiffness and resiliency by the combination, with a comparatively thin body of rubber or cloth and rubber, of light metallic supports, whereby I am enabled to make the boot or shoe much lighter, and hence more comfortable to the wearer, less liable to crack in the vicinity of the bends which have to occur while the article is in actual use, and hence more durable, while at the same time the cost of manufacture of the thus improved article is no more, and perhaps less, than that heretofore made.

To this end and object my invention may be said to consist, essentially, in the combination, with the rubber or cloth and rubber of which the article of foot-wear is made, of one or more metallic stiffeners or re-enforcing devices so incorporated with the layers of material during the process of manufacture of the article that the said stiffener or stiffeners while incapable of movement relatively to the said layers of material will bend with the latter, and will also lend to the material the proper degree of resiliency and make it self-supporting when the article is not in use, all as will be hereinafter more fully described, and as will be more particularly pointed out in the claim of this specification.

To enable those skilled in the art of manufacturing that type of foot-wear to which my invention relates to readily understand and easily practice the latter, I will now proceed to more fully describe my improvement, referring by letter to the accompanying drawings, in which I have shown my invention carried into effect under the precise details of construction which I have so far followed in practicing it, though of course modifications may be made therein.

In the drawings, Figure 1 is a side view of a rubber boot made according to my invention. Fig. 2 is a similar view showing a different form of the metallic re-enforcing device. Fig. 3 is a back view of a similar boot having in it another form of metallic stiffener applied at another locality; and Fig. 4 is a similar view showing what is illustrated at Fig. 1, with the addition of another set of metallic devices.

In all the figures, A is the leg portion, and B the foot portion, of a rubber boot made according to my invention, while $e$, $f$, $g$, and $h$ are respectively the four different forms of metallic stiffener device illustrated in said figures as applied to the leg and foot portions of the boot.

In carrying out my invention in the manner illustrated at Fig. 1 I employ a metallic wire of spring-steel (preferably about No. 20 wire) that is made up into the wave-shaped pattern or condition shown in said figure, and in practice so far I have found it desirable to use two such metallic devices arranged one on each side of the boot-leg. The precise curves or bends in the wire shown are not important, as the only object in view is to have the metallic device shaped so that after it shall have been incorporated in the boot it cannot move relatively to the material or stock with which it is combined.

As shown, the stiffener $e$, as well as the other forms of devices seen at Figs. 2 and 3, is only long enough to extend from a point slightly below that which coincides with the ankle-joint of a person wearing the boot to one considerably above said point; but each of said stiffeners might be made somewhat longer or shorter, of course, without materially changing its designed action and effects.

At Fig. 2 the metallic device $f$, it will be seen, is of that form produced by taking the piece of wire and bending it at each end to form a ring or loop, while at Fig. 3 the metallic device $g$ comprises a thin narrow plate of spring-steel having its edges scalloped or notched, the effect of the shape of the metallic re-enforcing device in each case being to prevent any movement relatively to the layers of material with which it is combined after it shall have been incased therein.

In the form of improved boot shown at Fig. 4 supplemental re-enforcing devices $h$ are employed, combined with the vamp of the upper, while the devices $e$ are, as in the case shown at Fig. 1, employed to re-enforce the leg portion of the boot, and of course in a shoe it would be desirable or practicable to use only the re-enforcing devices $h$, which, like those lettered $e$, are composed of small spring-wires, each formed into a zigzag or wave-like shape.

As will be seen from the drawings, that form of stiffener or re-enforcing device composed of a metallic plate $g$ I have combined with the rear portion or back side of the boot-leg, and in applying the metallic re-enforce to this part of the boot this form of device I have found more desirable than that shown at Fig. 1 or at Fig. 2, while the latter are better adapted than $g$ to the sides of the boot-leg. It will, however, be understood that it is not important what precise forms the metallic devices have, so long as they be shaped so that, after incorporation within the layers of material composing the upper of the article of foot-wear, they cannot move or work endwise relatively to the said incasing material.

No matter which or what form of the metallic device be adopted, the said device must be completely enveloped by a solid wrapping, coating, or jacket of rubber or rubbered cloth, which fits to every part of the surface of said device, before the latter is made up into the boot or shoe. Then in combining the thus coated or jacketed metallic device with that part of the boot or shoe which it is intended to stiffen or re-enforce the said device is placed in the proper position between two opposing layers of rubber or rubbered surfaces, with which opposing surfaces of rubber (which are united in the process of making the boot or shoe) the rubber jacket or envelope of each metallic device is united, so as to become integral with the said rubber layers. Thus the rubber-coated metallic device and the layers of rubber between which it is confined become, though not a homogeneous mass or body, practically integral, so that, while the metallic device lends to the entire structure the qualities of stiffness and resiliency to the desired extent, said structure is lighter and more comfortable as an article of foot-wear and capable of rendering more service than the article heretofore made, in which these qualities were sought to be attained by re-enforcing certain portions of the boot or shoe with supplemental pieces of or by increasing at certain points the thickness of the rubber or cloth and rubber of which the article is made.

I am aware of the fact that metallic stays have been used in connection with the uppers of leather shoes, and that it has been proposed to use spiral springs in conjunction with the legs of leather boots; also, that metallic bars have been combined with the uppers of bathing-shoes to assist in holding the leg or ankle portion of the upper in place while on the wearer and saturated with water; but in all such things the metallic devices have simply been removably inserted within pockets formed in or applied to the article of foot-wear, (very much after the fashion or plan practiced in applying whalebone and metallic stays to women's corsets,) and such things should easily be distinguishable from my invention, in which it is essential to have the metallic device so shaped and applied that, like the rubber re-enforces heretofore employed, there can occur no relative movement between the incased or enveloped metallic surfaces and the incasing rubber surfaces.

What I claim as new, and desire to secure by Letters Patent, is—

As an improved article of manufacture, a rubber boot or shoe having combined with its upper rubber-covered metallic stiffeners or re-enforcing devices, each of which is surrounded by the rubber compound which enters into the construction of said upper and is united therewith during the process of vulcanization of the said upper, all in substantially the manner and for the purposes set forth.

In witness whereof I have hereunto set my hand this 19th day of July, 1890.

EMMETT A. SAUNDERS.

In presence of—
WM. T. RODENBACH,
C. E. MERAMBLE.